(12) United States Patent
Whiteford et al.

(10) Patent No.: US 11,306,794 B2
(45) Date of Patent: Apr. 19, 2022

(54) DAMPING DEVICES, SYSTEMS AND METHODS FOR HOLLOW SHAFTS, STRUTS, AND BEAMS WITH BENDING MODES

(71) Applicant: LORD Corporation, Cary, NC (US)

(72) Inventors: Gerald P. Whiteford, Waterford, PA (US); Daniel Zameroski, McKean, PA (US)

(73) Assignee: LORD Corporation, Cary, NC (US)

( * ) Notice: Subject to any disclaimer, the term of this patent is extended or adjusted under 35 U.S.C. 154(b) by 0 days.

(21) Appl. No.: 15/567,874

(22) PCT Filed: May 11, 2016

(86) PCT No.: PCT/US2016/031756
§ 371 (c)(1),
(2) Date: Oct. 19, 2017

(87) PCT Pub. No.: WO2016/183139
PCT Pub. Date: Nov. 17, 2016

(65) Prior Publication Data
US 2018/0094687 A1   Apr. 5, 2018

Related U.S. Application Data

(60) Provisional application No. 62/159,709, filed on May 11, 2015.

(51) Int. Cl.
*F16F 7/09*    (2006.01)
*F16F 15/129*  (2006.01)
(Continued)

(52) U.S. Cl.
CPC ............ *F16F 7/095* (2013.01); *F16F 7/06* (2013.01); *F16F 15/02* (2013.01); *F16F 15/126* (2013.01);
(Continued)

(58) Field of Classification Search
CPC .......... F16F 7/095; F16F 7/06; F16F 15/1292; F16F 15/1207; F16F 15/02; F16F 15/126; F16F 15/1414

See application file for complete search history.

(56) References Cited

U.S. PATENT DOCUMENTS 2,028,930 A * 1/1936 Taylor ................... H02G 7/14
                                                    174/131 R
3,357,850 A   12/1967 Baker
(Continued)

FOREIGN PATENT DOCUMENTS

CN   1124335 A   6/1996
CN   1139186 A   1/1997
(Continued)

OTHER PUBLICATIONS

Written Opinion and International Search Report for Application No. PCT/US2016/031756 dated Sep. 8, 2016.
(Continued)

*Primary Examiner* — Melody M Burch
(74) *Attorney, Agent, or Firm* — Jenkins, Wilson, Taylor & Hunt, P.A.

(57) ABSTRACT

Devices, systems, and methods for damping vibration of a structural component or power-transmission shafts are disclosed. Damping devices, systems, and methods utilize a lightweight damping device, which is targeted at reducing the resonant amplitude of the first several beaming modes and/or torsional modes of bending a structural component comprising a hollow shaft or strut. The damping device includes a stiff concentric tube with damping elements disposed at each end. The device is inserted within the original structural component or shaft and attached thereto. When the primary shaft undergoes bending due to modal
(Continued)

characteristics, the damping elements react to dissipate energy, which effectively reduces the resonant amplitude.

20 Claims, 5 Drawing Sheets

(51) Int. Cl.
*F16F 15/126* (2006.01)
*F16F 15/14* (2006.01)
*F16F 7/06* (2006.01)
*F16F 15/02* (2006.01)
*F16F 15/12* (2006.01)

(52) U.S. Cl.
CPC ...... *F16F 15/1207* (2013.01); *F16F 15/1292* (2013.01); *F16F 15/1414* (2013.01)

(56) References Cited

U.S. PATENT DOCUMENTS

| | | | |
|---|---|---|---|
| 4,011,929 A * | 3/1977 | Jeram | F16F 7/01 188/268 |
| 4,207,957 A * | 6/1980 | Sivers | B60K 17/22 180/380 |
| 4,554,825 A | 11/1985 | Biermann | |
| 4,739,702 A * | 4/1988 | Kobler | B41F 13/085 101/216 |
| 4,954,375 A | 9/1990 | Sattinger et al. | |
| 5,108,802 A | 4/1992 | Sattinger | |
| 5,203,435 A | 4/1993 | Dolgin | |
| 5,356,264 A | 10/1994 | Watson et al. | |
| 5,425,287 A * | 6/1995 | Beattie | F16F 15/1442 464/180 |
| 5,667,204 A | 9/1997 | Slocum et al. | |
| 5,671,909 A | 9/1997 | Hamada et al. | |
| 5,701,790 A * | 12/1997 | Saito | B21D 28/12 83/136 |
| 5,799,924 A | 9/1998 | Slocum et al. | |
| 5,884,902 A | 3/1999 | Hamada et al. | |
| 5,904,066 A | 5/1999 | Lehman | |
| 6,070,734 A | 6/2000 | Hunt et al. | |
| 6,315,309 B1 * | 11/2001 | Li | B62B 7/08 188/19 |
| 6,321,890 B1 | 11/2001 | Suzuki et al. | |
| 6,457,570 B2 | 10/2002 | Reid et al. | |
| 6,514,040 B2 | 2/2003 | Lewis et al. | |
| 6,701,680 B2 | 3/2004 | Fanucci et al. | |
| 6,856,920 B2 | 2/2005 | Millott et al. | |
| 7,635,118 B2 | 12/2009 | Hayashi et al. | |
| 8,113,772 B2 | 2/2012 | Baumhauer et al. | |
| 8,522,417 B2 | 9/2013 | Miller | |
| 8,863,390 B1 | 10/2014 | Ley et al. | |
| 8,943,763 B2 | 2/2015 | Lim | |
| 2002/0171240 A1 * | 11/2002 | Cwik | F01N 13/1816 285/301 |
| 2007/0204453 A1 * | 9/2007 | Sun | F16F 15/322 29/407.07 |
| 2011/0209956 A1 * | 9/2011 | Maeda | F16F 9/3488 188/322.13 |
| 2014/0342841 A1 | 11/2014 | Argento et al. | |
| 2015/0101268 A1 | 4/2015 | Montgomery et al. | |

FOREIGN PATENT DOCUMENTS

| | | |
|---|---|---|
| CN | 1220634 A | 6/1999 |
| CN | 1807925 A | 7/2006 |
| CN | 101539180 A | 9/2009 |
| CN | 107580661 B | 9/2019 |
| DE | 27 47 225 | 4/1979 |
| EP | 3 295 052 B1 | 5/2020 |
| JP | 2003 184940 | 7/2003 |
| JP | 2004 156674 | 6/2004 |
| JP | 2011 241603 | 12/2011 |
| WO | 96/04491 | 2/1996 |

OTHER PUBLICATIONS

Chinese Office Action for Application No. 201680027628 dated Oct. 25, 2018.
European Search Report for Application No. 18184389.7 dated Oct. 31, 2018.
European Office Action for Application No. 18184389.7 dated Jan. 2, 2020.
European Office Action for Application No. 18184389.7 dated Jul. 3, 2020.

* cited by examiner

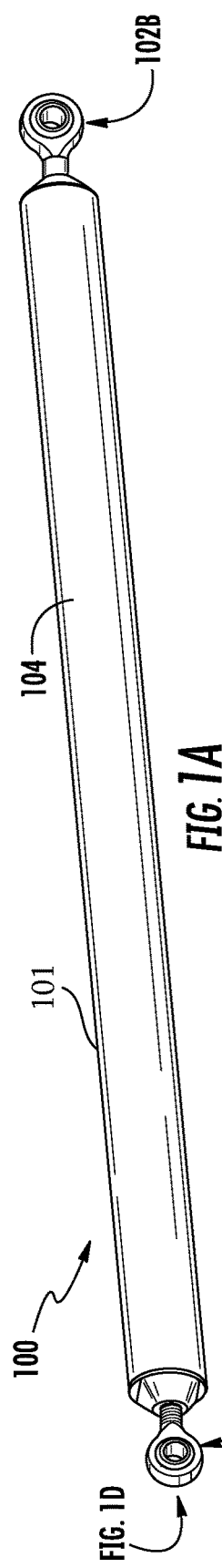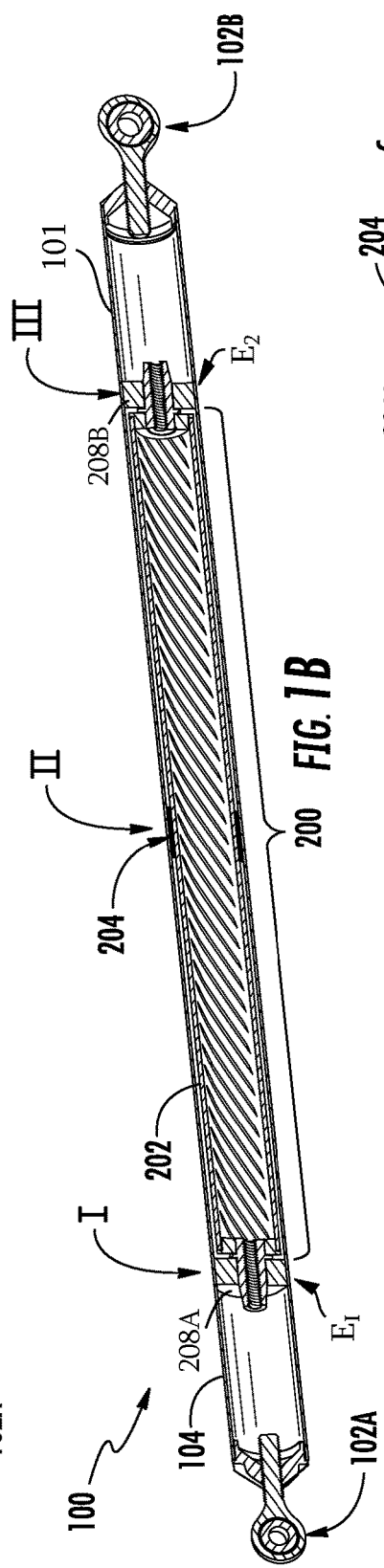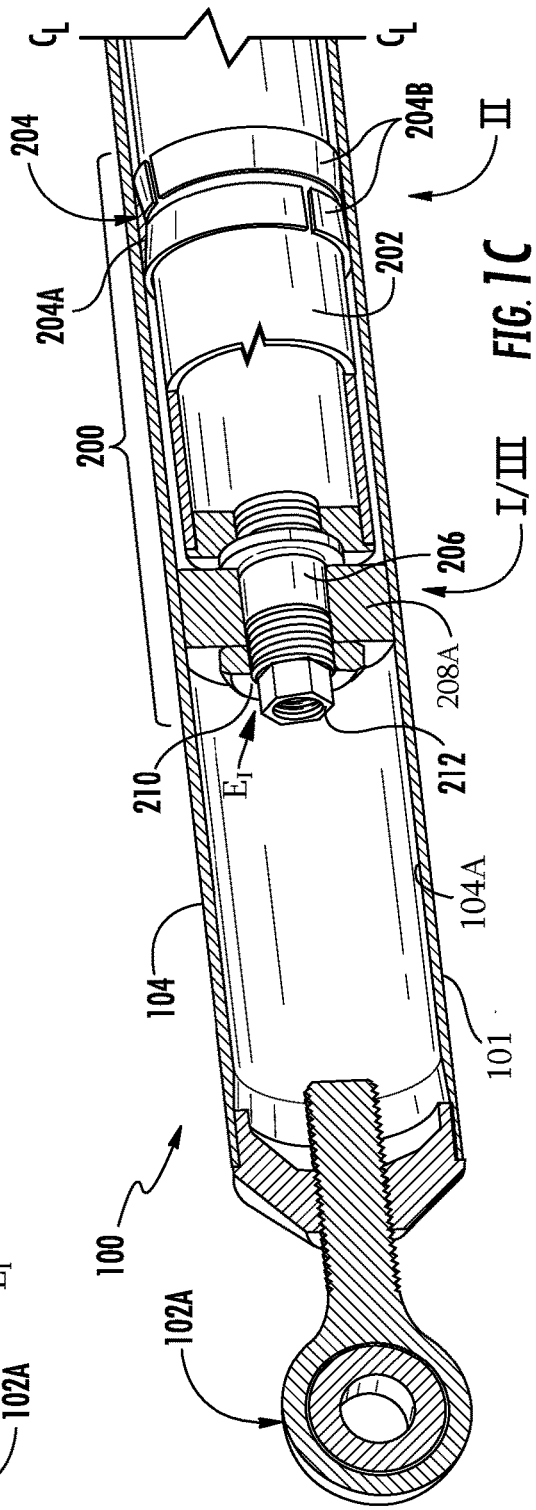

DAMPING DEVICES, SYSTEMS AND METHODS FOR HOLLOW SHAFTS, STRUTS, AND BEAMS WITH BENDING MODES

CROSS-REFERENCE TO RELATED APPLICATIONS

The present application claims priority to U.S. Provisional Patent Application Ser. No. 62/159,709, filed on May 11, 2015, the disclosure of which is incorporated herein by reference in its entirety.

TECHNICAL FIELD

The subject matter herein relates generally to devices, systems, and methods for damping vibration. The subject matter herein more particularly relates to devices, systems, and methods for damping the resonant amplitude of beaming and/or torsional modes of vibration associated with a structural component.

BACKGROUND

Structural components, including shafts, struts, and beams, are used in a variety of different applications, for example, in frames or mounts for supporting, equipment or machinery. Individual shafts and/or struts are typically hollow, which allows manufacturers and/or operators to benefit from reductions in cost and/or weight, for example, especially in regards to vehicle (e.g., aircraft, automobile, etc.) systems. Rotating components within the supported machinery (e.g., engines, motors, rotors, propellers, or the like) can impart vibration to the hollow shafts and struts supporting the equipment. In some aspects, this vibration can excite flexural and torsional beaming modes of vibration imparted to individual struts within a frame or mount. In other applications, hollow rotating shafts, supported within bearings, are used for power-transmission in various types of machinery. In these applications, operational angular velocities near or through the shaft's critical speed range can induce resonant vibration throughout the shaft and equipment.

Conventional methods of reducing vibration within a structural component or power transmission shaft include either designing a component that will have a suitable margin or thickness between the rotating structure and the individual structural component, or providing a tuned mass for altering the tuning of the structural component. Conventional methods are problematic, however, as adding margins and/or tuned masses will increase the weight of the structural component, which is undesirable.

Accordingly, a need exists for improved damping devices, systems, and methods for decreasing vibration within a structural component or power-transmission shaft, and reducing the amplitude of flexural and/or torsional beaming modes of vibration that are acting on the structural component.

SUMMARY

In accordance with this disclosure, damping devices, systems, and methods for damping resonant vibrations of a hollow strut, shaft, or tube are provided. An exemplary damping device includes a tube member comprising a first end and a second end. A first damping element is disposed on the first end of the tube member and a second damping element disposed at the second end of the tube member. The first and second damping elements are configured to flex against a structural component for dissipating energy from the structural component and for reducing the bending of the structural component due to modal characteristics induced by vibration.

In some embodiments, damping devices herein are configured to physically contact the structural component in three discrete locations, or less. Damping devices herein are configured to physically contact the structural component in a location proximate a center of a longitudinal axis of the structural component. Damping devices herein comprise a length that is between about 10% and about 80% of the length of the structural component. Damping devices herein are attached to a structural component via a retention ring, a clamp, adhesive, brazing, or welding.

An exemplary damping system comprises a hollow structural component and a damping device disposed inside the hollow structural component. The damping device comprises a tube member that is concentric with the structural component or power transmission shaft and at least one damping element attached to a portion of the tube member. The damping element is disposed between portions of an inner wall of the structural component and the tube member. The damping element is configured to dissipate vibration and reduce bending of the structural component due to modal characteristics excited by vibration of the supported equipment or rotating shaft. The damping device physically contacts the inner wall of the structural component in three discrete contact points or less.

An exemplary method of damping vibration includes providing a tube member comprising a first end and a second end, attaching a first damping element to the first end of the tube member, and attaching a second damping element to the second end of the tube member. The method further includes flexing the first and second damping elements against a structural component or power-transmission shaft for dissipating energy from the component and for reducing the bending of the component due to modal characteristics excited by vibration.

In some embodiments, damping devices herein include damping elements comprising a viscoelastic material, such as silicone. In some embodiments, damping elements include a spring element that is configured to clamp a friction element to an insert element to generate a frictional force to damp vibration. In some embodiments, damping elements include a metallic mesh for higher temperature resistance. In some embodiments, the damping elements are each configured to flex against an inner wall of the structural component.

In one aspect, a damping device is provided. The damping device comprises a structural component, a tube member, a first damping element, and a second damping element. The tube member is disposed inside of the structural component, the tube member having a first end and a second end. The first damping element is disposed on the first end of the tube member. The second damping element is disposed on the second end of the tube member. Wherein the first damping element and the second damping element are configured to flex against the structural component for dissipating energy from the structural component and for reducing the bending of the structural component due to modal characteristics induced by vibration. In one embodiment, the damping device physically contacts the structural component in three discrete locations (I, II, III) or less. In one embodiment, the damping device physically contacts the structural component in a location (II) proximate a center ($C_L$) of a longitudinal axis of the structural component. In one embodiment, the tube member comprises a length that is between about 10% and about 80% of the length of the structural component. In one embodiment, at least one of the first and second damping elements comprises silicone. In one embodiment, at least one of the first and second damping elements comprises a spring element that is configured to clamp a friction element to an insert element to generate a frictional force to damp vibration. In one embodiment, at least one of the first and second damping elements comprise a metallic mesh for higher temperature resistance. In one embodiment, the first damping element and the second damping element are configured to flex against an inner wall of the structural component. In one embodiment, the tube member is attached to the structural component via a retention ring, a clamp, adhesive, brazing, or welding.

In another aspect, a damping system is provided. The damping system comprises a structural component, and a damping device. The structural component comprising at least one inner wall, the structural component being hollow. The damping device is disposed within the structural component. The damping device further comprises a tube member and at least one damping element. The tube member is concentric with the structural component. The at least one damping element is attached to a portion of the tube member, wherein the damping element is disposed between portions of the inner wall of the structural component and the tube member. Wherein the damping element is configured to dissipate vibration and reduce bending of the structural component due to modal characteristics induced by vibration of the structural component. In one embodiment, the system comprises having the damping device physically contacts the inner wall of the structural component in at least two or more contact points (I, II). In one embodiment, the system comprises having at least a one contact point (II) proximate a center ($C_L$) of a longitudinal axis of the structural component. In one embodiment, the system further comprises a first and second damping elements disposed on opposing ends of the tube member. In one embodiment, the tube member comprises a length that is between about 10% and about 80% of the length of the structural component. In one embodiment, the at least one damping element comprises silicone. In one embodiment, the at least one damping element comprises a spring element that is configured to clamp a friction element to an insert element for generating a frictional force to damp vibration. In one embodiment, the at least one damping element comprises a metallic mesh. In one embodiment, the at least one damping element is configured to reduce a resonant amplitude of at least a first bending mode of the structural component.

In yet another aspect, a method of vibration damping is provided. The method includes the steps of:
A. providing a structural component (101);
B. providing a tube member (202) within the structural component, the tube member having a first end (E1) and a second end (E2);
C. attaching a first damping element (208A) to the first end of the tube member and attaching a second damping element (208B) to the second end of the tube member; and
D. flexing the first and second damping elements against the structural component for dissipating energy from the structural component and for reducing the bending of the structural component due to modal characteristics excited by vibration In one embodiment, the method further comprises positioning the damping device inside of the structural component so that the damping device physically contacts the structural component at least three discrete locations (I, II, III). In one embodiment, the method further comprises positioning the damping device inside of the structural component so that the damping device physically contacts the structural component in a location (II) that is proximate a center ($C_L$) of a longitudinal axis of the structural component.

Damping devices, systems, and methods herein reduce the resonant amplitude of the first several beaming modes and/or torsional modes of a hollow shaft or strut. Numerous objects and advantages of the inventive subject matter will become apparent as the following detailed description of the preferred embodiments is read in conjunction with the drawings, which illustrate such embodiments.

BRIEF DESCRIPTION OF THE DRAWINGS

FIGS. 1A-1D are perspective side, sectional, and end views of a damping device and system according to an embodiment of the presently disclosed subject matter.

DETAILED DESCRIPTION

Figure 1D:
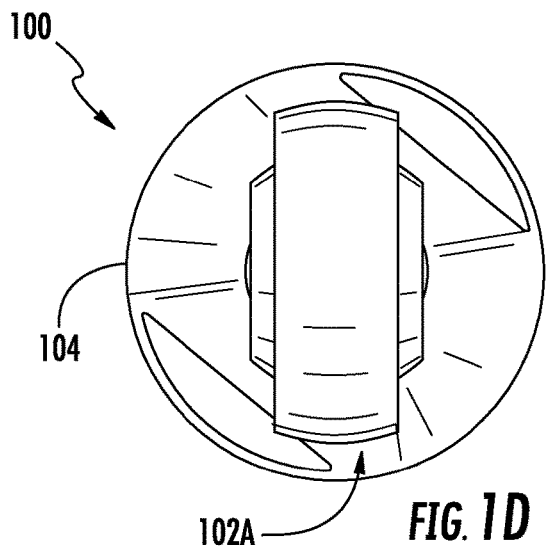

Figures (also "FIGS.") 1A to 4 illustrate various views, embodiments, and/or aspects associated with vibration damping devices, systems, and related methods by which the life of structural components associated with rotating machinery or equipment may be extended. In some embodiments, devices, systems, and methods herein dissipate vibrational energy via the addition of stiffness and/or damping to a structural component, such as a hollow strut or shaft. Devices, systems, and methods herein are configured to reduce the resonant transmissibility associated with torsional modes and/or one or more primary bending modes of a structural component (e.g., a fixed shaft, strut, or beam). In some embodiments, the thickness of many shafts, struts, or beams, which were originally designed according to fatigue strength through resonance, may be reduced when vibrations are effectively damped. Thus, devices, systems, and methods herein provide a strut-and-damper assembly, which may advantageously be lighter-weight than the original strut.

Devices, systems, and methods set forth herein may be used in many different applications, not limited to use within structural components and/or structural component systems, such as, for example, rotating shafts (e.g., operating near a critical speed or accelerating through a critical speed), airframe struts, auxiliary power unit supports, support frame components, engine attachment supports and frame components, attach frame components, engine mount components, drive shafts (e.g., for vehicles not limited to aircraft and/or automobiles), high-speed internal shafts within engines, power transmission shafts in high-speed rotating equipment, vehicle systems, engine systems, or the like.

Damper devices, systems, and methods herein may comprise internal damping devices, suited for damping vibration and/or resonant amplitude of various structural components such as shafts, struts, frame members, and/or beams. In some embodiments, devices, systems, and methods herein can be used address the torsional mode (twist) of the structural component along with the primary bending or beaming modes.

Referring to FIGS. 1A-4, several non-limiting, exemplary embodiments of damping devices, systems, and methods are illustrated. As each of the figures is exemplary, some elements and/or the functionality thereof may be combined, separated, integrated, and/or modified while remaining within the scope of the claims.

Referring to FIGS. 1A-1C, a damping system, generally designated 100, is illustrated. In some embodiments, damping system 100 includes at least one structural component 101 and a damping device, generally designated 200. As illustrated, structural component 101 includes a strut, shaft, a beam, or the like. Damping device 200 may include an internal damping device, which is configured to attach or connect to the structural component and in some embodiments, is inserted therein and/or integrated therewith. Damping device 200 includes a first end $E_1$ and a second end $E_2$ opposing the first end.

FIG. 1A is a perspective view of a structural component 101, such as a beam, a strut, a bar, or a shaft, having a component body 104 disposed between a first end 102A and a second end 102B. Structural component 101 may be used alone and/or in combination with one or more additional structural components 101 to form a frame or mounting structure for supporting and/or mounting portions of a machine with vibration-producing sources (not shown, e.g., an engine, rotor, propeller, drive shaft, rotating shaft, etc.). First and second ends 102A and 102B may include end fittings that are fixedly attached or connected to one or more additional structures (not shown) for supporting body 104 therebetween. In some embodiments, each end (e.g., 102A, 102B) include eye-bolts, fasteners, pins, clips, hooks, screws, twist-lock fittings, snap on fittings, or any other type of fittings or fastening structures.

In some embodiments, first and second ends 102A and 102B may independently connect and/or affix to a fixed support structure for an engine mount, a fixed machine component, a fixed housing (e.g., an engine housing), etc. In some exemplary embodiments, body 104 exhibits or experiences one or more resonant beaming modes (e.g., bending and/or torsional modes) when vibrations are transferred thereto from the supported equipment (not shown). Damping devices, systems, and methods herein are configured to reduce the resonant transmissibility associated with one or more primary beaming modes and/or torsional modes acting on a structural component body 104. In some embodiments, body 104 includes a primary shaft, strut, beam, bar, or tube that is configured to receive (e.g., internally) a secondary damping tube in the form of a damping device 200 (FIG. 1B). Body 104 may be formed of any material including but not limited to metal, a metal alloy, steel, aluminum (Al), plastic, any rigid material, any flexible material, any composite material, or the like.

FIG. 1B is a sectional view of system 100 taken longitudinally between first and second ends 102A and 102B of FIG. 1A. As FIG. 1B illustrates, the structural component 101 may include a hollow body 104. As illustrated, a damping device 200 is positioned or otherwise disposed within a portion of body 104, for example, between one or more inner walls 104A of structural component 101 and/or body 104. Damping device 200 is configured to physically contact body 104 (e.g., inner walls 104A of body 104) in at least two or more locations. As FIG. 1B illustrates, device 200 may contact body 104 in at least three locations, generally designated I, II, and III. The number of contact points or contact locations (e.g., I, II, III) between device 200 and body 104 of structural component 101 depends upon the length and/or diameter of body 104, and is not limited to any specific number of contact points or contact locations.

In some embodiments, device 200 comprises a tubular (cylindrical) shaped body or tube member 202 that is disposed within body 104 of a hollow shaft or strut. In some embodiments, tube member 202 and body 104 are concentric structures having a same centerline, center plane, center point, or center axis (any of a center x, y, or z-axis). In some aspects, body 104 is referred to as a "primary" tube and tube member 202 is referred to as a "secondary" tube within damping system 100. Tube member 202 may include a stiff and/or rigid structure having an outer diameter that is smaller than an inner diameter of body 104, and can contact or connect to body 104 via a retaining structure or retaining ring, generally designated 204.

In some embodiments, retaining ring 204 includes one or more annular rings (e.g., 204A, 204B, FIG. 1C) disposed about an outermost diameter of tube member 202. Retaining ring 204 can comprise one or more components that are configured to clamp a portion of device 200 to body 104 and/or frictionally retain device 200 against inner walls 104A (FIG. 1C) of body 104. Retaining ring 204 may comprise a single retaining structure (e.g., ring) or a plurality of retaining structures (e.g., rings).

In some embodiments retaining ring 204 is disposed proximate a centerline or a central axis of tube member 202 and body 104, for example, along a centerline that bisects each tube (e.g., 202 and 104) along the respective longitudinal length into two substantially equal portions having a substantially same dimension. Retaining ring 204 may include a single annular member or multiple annular members configured to retain device 200 against one or more inner walls 104A of body 104, the members may overlap and/or be spaced apart from each other during retention of device 200 against inner wall 104A, potentially incorporating self-locking taper angles.

In some embodiments, retaining ring 204 is exemplary and optional, as an adhesive and/or interference fit component, press fit component, etc. may be provided between tube member 202 and body 104 to connect tube member 202 to body 104. For example, tube member 202 of device 200 may be secured to body 104 via adhesive, one or more mechanical fasteners (e.g., pins, hooks, screws, etc.), one or more frictional fasteners, one or more press fit components, soldering, brazing, welding, or the like. In some embodiments, retaining ring 204 comprises at least one tapered clamp ring. Where a metal damper tube member 202 is used, brazing, soldering, and/or welding may be used to attach the damper tube (e.g., tube member 202) to the primary tube (e.g., body 104).

As FIGS. 1B and 1C illustrate, damping device 200 is configured to contact body 104 at a first location I and a third location III via one or more damping devices or elements, in some embodiments, at least a first damping element 208A and a second damping element 208B. Each damping element (e.g., 208A and 208B) can comprise any suitable material and/or structure depending upon the amount of damping required and/or the damping environment. For example and in some embodiments, each damping element (e.g., 208A and 208B) may include a viscoelastic component, a metal component, a metal alloy component, a frictional spring damping component, an elastomer component, a plastic component, a wire mesh component or material, a friction-inducing element or component or material, a single discrete damping component, a multi-layered component, or the like. First and second damping elements 208A and 208B may each comprise a same size, shape, structure, and/or material; or first damping element 208A can comprise a different size, shape, structure, and/or material than the other, second damping element 208B.

In some embodiments, each damping element (e.g., 208A and 208B) is configured to dissipate energy (e.g., mechanical energy, vibrational energy, or the like) via flexing in response to vibrations and/or bending imparted to the body 104. In other embodiments, each damping element (e.g., 208A and 208B) is configured to dissipate vibrational energy upon the generation of friction or heat. Any size, shape, quantity, and/or type of damping element(s) can be provided. In this configuration, provision of discrete first and second damping elements 208A and 208B proximate opposing ends $E_1$ and $E_2$ of tube member 202 and/or body 104 can advantageously allow such elements or components to be readily installed and/or replaced as needed, while still providing effective damping when in an installed state. However, more than two, or less than two damping elements may also be provided.

In some embodiments, damping device 200 is configured to contact body 204 at a second, centralized location II via retaining ring 104 or other retaining structure and/or retaining material. In some embodiments, damping device 200 only contacts body 104 at three locations. In other embodiments, damping device 200 contacts body 104 at more than three locations (e.g., where a longer body 104 is provided) or at less than three locations (e.g., where a shorter body 104 is provided). The length of damping device 200 as compared to the length of body 104 may be optimized or improved as desired, for example, based upon factors including the amount of damping desired, the type of damping desired (e.g., resonant, torsional), the beaming mode, and/or the damping environment (e.g., thermal environment, chemical environment, etc.).

In some embodiments, tube member 202 is a stiff and/or substantially rigid body of material comprising a metal, a metal alloy, steel, Al, plastic, a composite material, or any other stiff, lightweight material. Tube member 202 may also be hollow for facilitating weight reduction of system 100. Damping device 200 may be configured to dissipate energy via the addition of both stiffness and damping, which can collectively and effectively reduce the resonant amplitude at which body 104 is vibrating.

In some embodiments, a length of device 200 ranges from about 10% to about 80% of the length of the overall, original body 104 (e.g., not including ends 102A and 102B). The length of device 200 and respective tube member 202 can be validated, optimized, and/or set to any value, where desired. In some embodiments, body 104 is about 24 inches (about 61 centimeters) long and tube member 202 can range in length from about 4.8 inches to about 20 inches (about 12.2 centimeters to about 51 centimeters). Any length of body 104 and/or tube member 202 can be provided. Similarly, any ratio between the length of body 104 and tube member 202 can be provided. In some aspects, body 104 and tube member 202 comprise concentric and cylindrical annular-shaped shells, wherein body 104 fully encases and/or surrounds tube member 202. A non-limiting ratio between a length ($L_B$) of body 104 and a length ($L_T$) of tube member 202 may include a ratio ($L_B/L_T$) of about 0.5 or more, about 1.0 or more, about 1.3 or more, about 2.0 or more, about 3.0 or more, about 4.0 or more, about 5.0 or more, or the like.

Referring to FIG. 1C and in some embodiments, damping element 208A is illustrated as being secured to tube member 202 via an end fitting or adapter 206. Adapter 206 may include a body of metal or a metal alloy configured to isolate a respective damping element (e.g., 208A and 208B) and connect the damping element to outermost, opposing ends of tube member 202. FIG. 1C is an enhanced (closer) view of one-half of system 100 and device 200 as shown in FIG. 1B, with the opposing side (not shown) being a mirror image of that shown. A retaining member 210 and a securing element 212 can further isolate each damping element (e.g., 208A and 208B) to an end of device 200, and secure damping element to adapter 206. In some aspects, securing element 212 includes a hexagonal nut configured to threadingly engage a body of adapter 206 for securing first damping element 208A thereto.

As FIG. 1C further illustrates, retaining ring 204 includes one or more (e.g., a plurality of) annular rings disposed in a stack and/or a layered or sandwich structure for retaining device 200 within body 104 (e.g., within an inner wall 104A of a strut, shaft, beam, or structural component 101). Retaining ring 204 may include an outer tapered ring member 204A disposed over and/or about one or more inner tapered ring members 204B. Outer ring member 204A and inner ring members 204B include a tapered cross-section, and each ring member is configured to clamp together about or against an outer diameter of tube member 202 for securing tube member 202 to an inner wall 104A of body 104. Retaining ring 204 and/or portions thereof (e.g., 204A, 204B, etc.) can comprise any material including but not limited to a metal, a metal alloy, steel, Al, plastic, a polymer, or the like.

In some embodiments, first and second damping elements 208A and 208B include elastomeric elements secured to opposing first and second ends of damping device 200. Damping elements 208A and 208B can comprise any suitable size, shape, structure, dimension, and/or material. In some aspects, damping elements 208A and 208B include a viscoelastic material, an elastomer, silicone, rubber, a polymer, foam, a synthetic material, an impact absorbing material, or the like. Damping elements 208A and 208B are configured to target and reduce a resonant amplitude of beaming and/or torsional modes of vibration associated with a structural component 101 or body 104, for example, a vibrating shaft or strut. A method of damping vibration includes providing a hollow structural component (e.g., a shaft, strut, or beam) 101 and inserting (positioning) a damping device 200 within the body 104 of the hollow structural component 101. Damping device 200 may include one or more discrete damping elements (e.g. 208A and 208B) optionally disposed on opposing ends of the damping device 200.

First and second elements 208A and 208B can comprise any suitable material or structure, for example and in some aspects, first and second damping elements 208A and 208B may be configured to flex, generate friction, generate heat, and/or otherwise react to beaming modes of body 104 for dissipating vibrational energy to reduce resonance of the structural component 101 or body 104 as body 104 exhibits one or more beaming modes of vibration.

FIG. 1D is an end view of system 100 as shown and described in FIG. 1A. Each end 102A and/or 102B can affix to another structure such that body 104 may be simply supported therebetween. When body 104 rotates and/or a rotating component imparts vibration to body 104, body 104 can resonate and exhibit a torsional mode and/or one or more primary beaming modes of vibration. Damping device 200 is configured to damp the amplitude of the resonant vibration without introduction of a tuning mass and/or without having to increase a distance, space, or margin between body 104 and the source of the vibration.

Figure 1E:
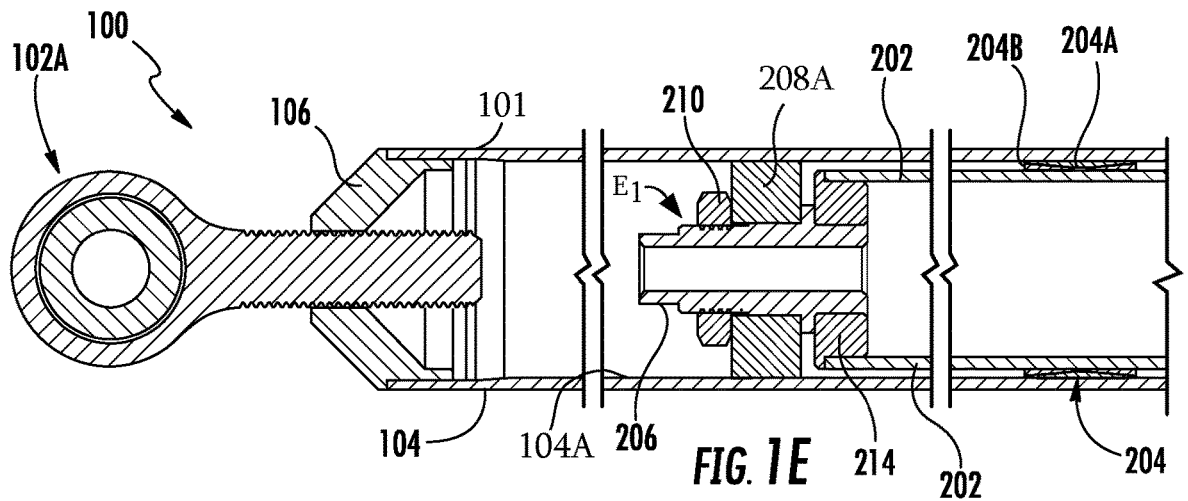
FIGS. 1E-1F are sectional views of the damping device and system according to an embodiment of the presently disclosed subject matter.
Figure 1F:
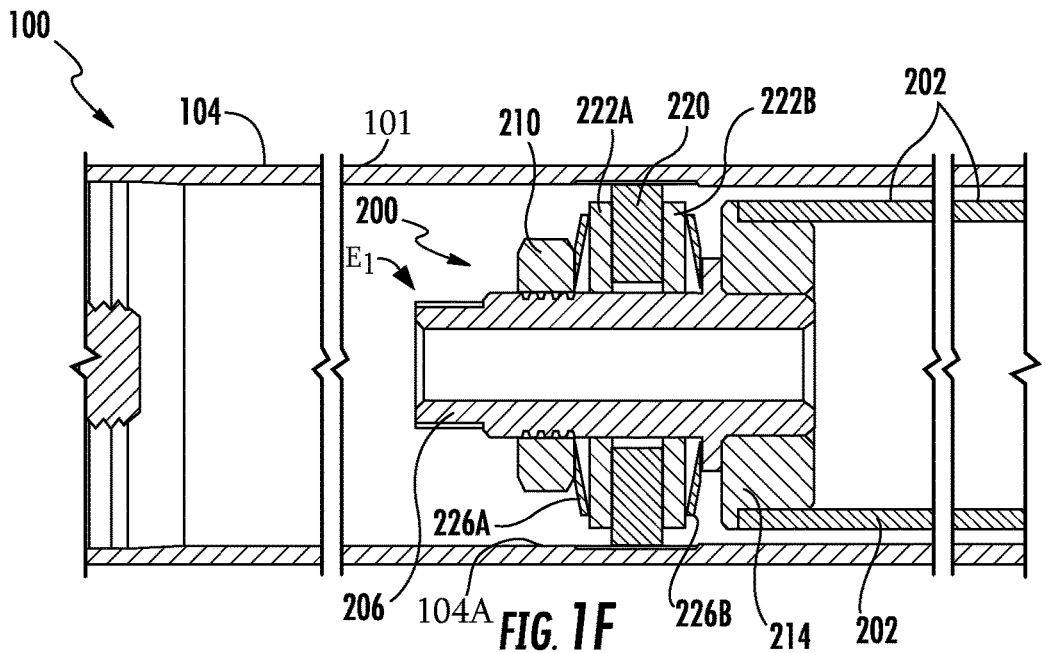

FIGS. 1E and 1F are sectional views of system 100, device 200, and/or portions thereof. A structural component 101 includes a primary tube (e.g., a shaft or a strut) having a hollow body 104 with at least one end 102A including an end fitting or connection member. Body 104 is connected to an end fitting or connection member via an adapter body or plug component 106. Component 106 may comprise a threaded aperture to which a threaded end fitting (e.g., a threaded eyebolt, a threaded pigtail hook, etc.) may threadingly attach and/or engage. Component 106 may also optionally include an outer diameter that is threaded. The outer diameter of component 106 may threadingly attach and/or engage with a threaded inner wall of body 104 for securing body 104 to end fitting. In other embodiments, component 106 may be press fit, welded, soldered, or otherwise attached to body 104. Body 104 is supported as a beam between opposing ends (e.g., 102A, 102B), which are affixed or may be affixed to other structures (not shown) via end fittings.

In FIG. 1E, damping may be accomplished via flexing (e.g., moving, rubbing, or snubbing) of first damping element 208A against at least one inner wall 104A of body 104 and/or of first damping element 208A between tube member 202 and body 104. The flexing of damping element 208A dissipates vibrational energy (e.g., torsional and/or bending) that is applied or transferred thereto from body 104. In some embodiments, damping element 208A includes a viscoelastic material such as an elastomer. However, the material chosen for damping elements 208A is optional and/or dependent upon the amount of damping required, the type of damping required, and/or the damping environment. One option for damping element 208A includes providing elastomeric damping elements 208A and 208B. The damping loss factor for elastomeric material is between about 0.2 and about 1.2 with the increased loss factor providing increased damping. First and second damping elements 208A and 208B (FIG. 1B) can attach and/or connect to tube member 202 via the threading of adapter 206 into an end fitting or end plug 214 of tube member 202. End plug 214 may include a body comprising metal, a metal alloy, or any other material (e.g., plastic, polymeric, composite, etc.) depending upon the damping environment and/or system.

In other embodiments, at least one of first and second damping elements 208A and 208B (FIG. 1B) may include a metallic mesh type of damping element. Providing a metallic mesh type of damping element improves the performance of the damping element at increased temperatures and/or improve the damping element's resistance to fluid and/or a fluid environment.

In some embodiments, at least one of first and second damping elements 208A and 208B may include a friction-damping elements (e.g., see FIG. 1F), which can be energized by a biasing member, such as a spring element 226A, 226B, to provide a frictional damping force at the end of the internal damper tube member 202. Under low vibratory loads, a friction spring element static friction force can prevent sliding. When vibratory levels exceed a level needed to generate force above the static friction force, then damping device 200 can slide and create a friction damping force for dissipating vibratory energy in the form of heat. This provides damping to the primary body 104 and reduces resonant amplitudes. Selection of a frictional material and/or a clamping force may be made to provide damping at the appropriate vibratory input levels for installation within a specific type of structural component 101, for example, a specific component that is subject to expected (e.g., estimated, calculated) vibration levels.

In yet further embodiments, at least one of first and second damping elements 208A and 208B may include a viscous type of damper element that utilizes a viscous fluid in shear to generate a damping force. The selection of the damping element type and/or material may be determined by the environment (temperature, fluid exposure, etc.), the amount of damping required, the input vibration levels (high levels can generate high heat output in the damper), assembly or manufacturing considerations, weight concerns, or the like.

Referring to FIG. 1F and in some embodiments, damping is accomplished via a friction damper arrangement. In some embodiments, damper device 200 includes a friction damper having a disc member or insert element 220 disposed between one or more friction elements 222A and 222B. Insert element 220 may be provided against an inner diameter of body 104. Insert element 220 may be taper locked against body 104, or affixed via adhesive, brazing, welding, soldering, an interference fit, a press-fit, or the like. In some embodiments, friction elements 222A and 222B react to motion transferred thereto via the internal damping tube end fitting (e.g., adapter 206), and are free to translate along a longitudinal tube axis. One or more spring elements 226A and 226B are configured to clamp friction elements 222A and 222B to insert element 220 to generate a frictional force for damping vibration and reducing the amplitude of flexural and/or torsional beaming FIGS. 1A to 1F illustrate exemplary embodiments of a lightweight damping device that is targeted at reducing the resonant amplitude of the first several beaming modes and/or torsional modes of vibration for a hollow structural component 101 or power transmission shaft. The damper consists of stiff concentric tube (e.g., 202) with one or more damping elements (e.g., viscoelastic, mesh, frictional, etc.) provided at each end (e.g., a first end and a second end of the tube member 202). The device may be inserted within a primary shaft (e.g., 104) and attached thereto, in some aspects, via an adhesive or retention ring 204 (FIG. 1B). In some embodiments, when the primary shaft (e.g., body 104) undergoes bending due to modal characteristics, the viscoelastic elements can flex and dissipate vibrational energy. This effectively reduces the resonant amplitude of vibration within the structural component 101. The length of damper device 200 is some fraction of the original strut length, for example, and can range from between about 20% to about 70% of the original strut length.

It will be appreciated that FIGS. 1A to 1F are for illustrative purposes only and that various structures, components, their locations, and/or their functions described above in relation to these figures may be changed, altered, added, or removed. For example, some structures and/or functions (e.g., damper elements, biasing members, etc.) may be separated into multiple entities, combined into a single entity, or utilized in different quantities and/or locations, where desired.

Figure 2A:
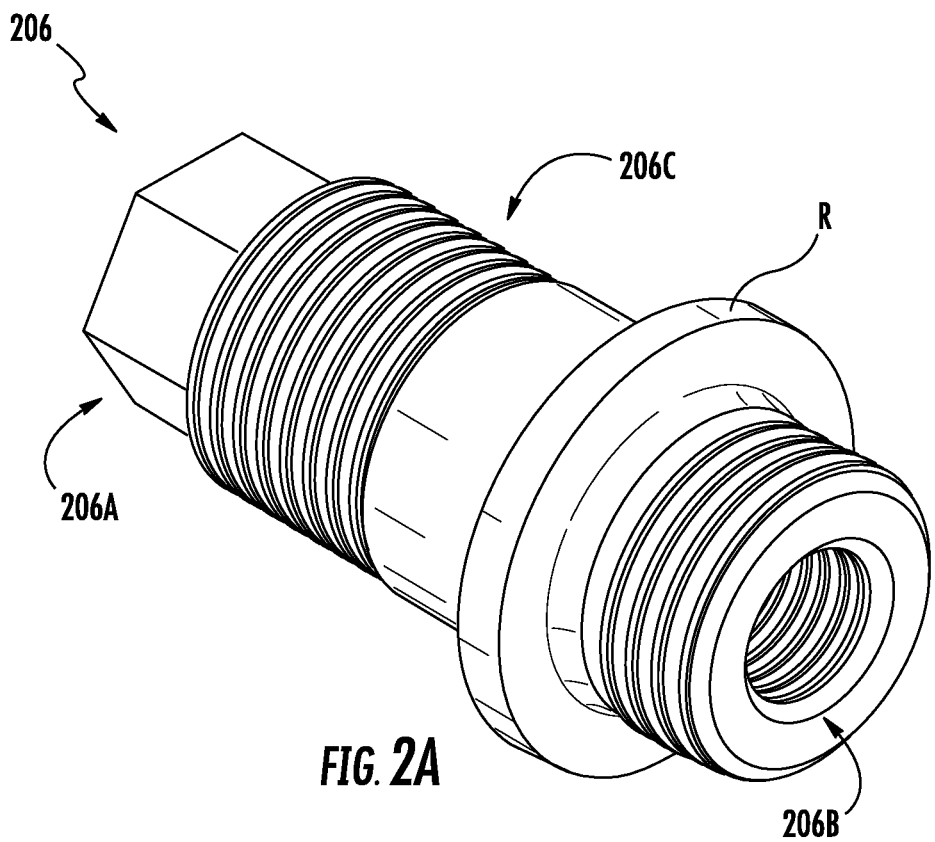
FIGS. 2A-2C are portions of a damping device according to an embodiment of the presently disclosed subject matter.
Figure 2B:
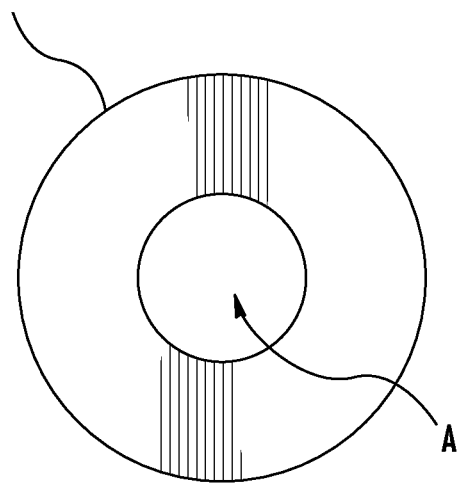
Figure 2C:
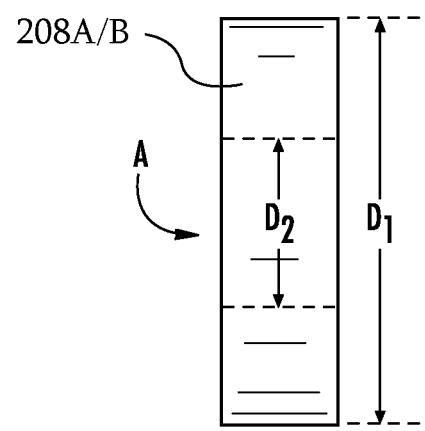

FIGS. 2A to 2C are additional views of portions of an exemplary damping device 200. FIG. 2A is a perspective view of adapter 206. Adapter 206 is configured to affix a damping element (e.g., 208A or 208B) onto opposing end portions of internal damping tube (e.g., tube member 202). As illustrated, adapter 206 comprises an end fitting or connection member having a first end 206A, a second end 206B, and a threaded outer body 206C. A damping device (e.g., a viscoelastic material, a metallic mesh, a frictional damping element, a viscous fluid, etc.) can be secured between a retainer and/or retaining portion R of adapter 206 and another retaining member (e.g., 210, FIG. 1E). In some embodiments, a damping device abuts retaining portion R and another retaining member (e.g., 210, FIG. 1E). Retaining member (e.g., 210, FIG. 1E) may be disposed over and/or threadingly engage first end 206A of adapter 206. Retaining portion R can comprise a shelf, a ledge, a wall, a flange, or the like adapted to prevent damping device 200 from becoming displaced within the primary tube body (e.g., 104, FIG. 1A). Second end 206B is configured to threadingly engaged a portion of tube member 202 (FIG. 1E) for attaching damping elements 208A (FIG. 1E) to the stiff tube damping device 200 (FIG. 1E).

FIGS. 2B and 2C illustrate an embodiment of damping elements 208A and 208B (referred to in FIG. 2C as "208A/B") disposed in a damping device. In this embodiment, damping element 208A/B includes a viscoelastic body having an aperture A that is disposed proximate a center of the damping element body. Damping elements 208A and 208B can comprise an outer diameter $D_1$ that is approximately equal to or slightly less than an inner diameter of a structural component (e.g., 101). Damping elements 208A and 208B can comprise an inner diameter $D_2$ that is approximately equal to an end fitting or adapter member (e.g., 206) that secures damping elements 208A and 208B to damping device 200. In some aspects, damping elements 208A and 208B comprises a silicone body having a machined aperture A. Damping elements 208A and 208B can be disposed on opposing ends of a damping device (e.g., 200, FIG. 1B) and flex, thereby dissipating vibration energy and/or resonance of the structural component 101 to which it is inserted.

It will be appreciated that FIGS. 2A to 2C are for illustrative purposes only and that various dimensions, sizes, shapes, etc., described above in relation to these figures may be changed, altered, added, or removed, where desired.

Figure 3:
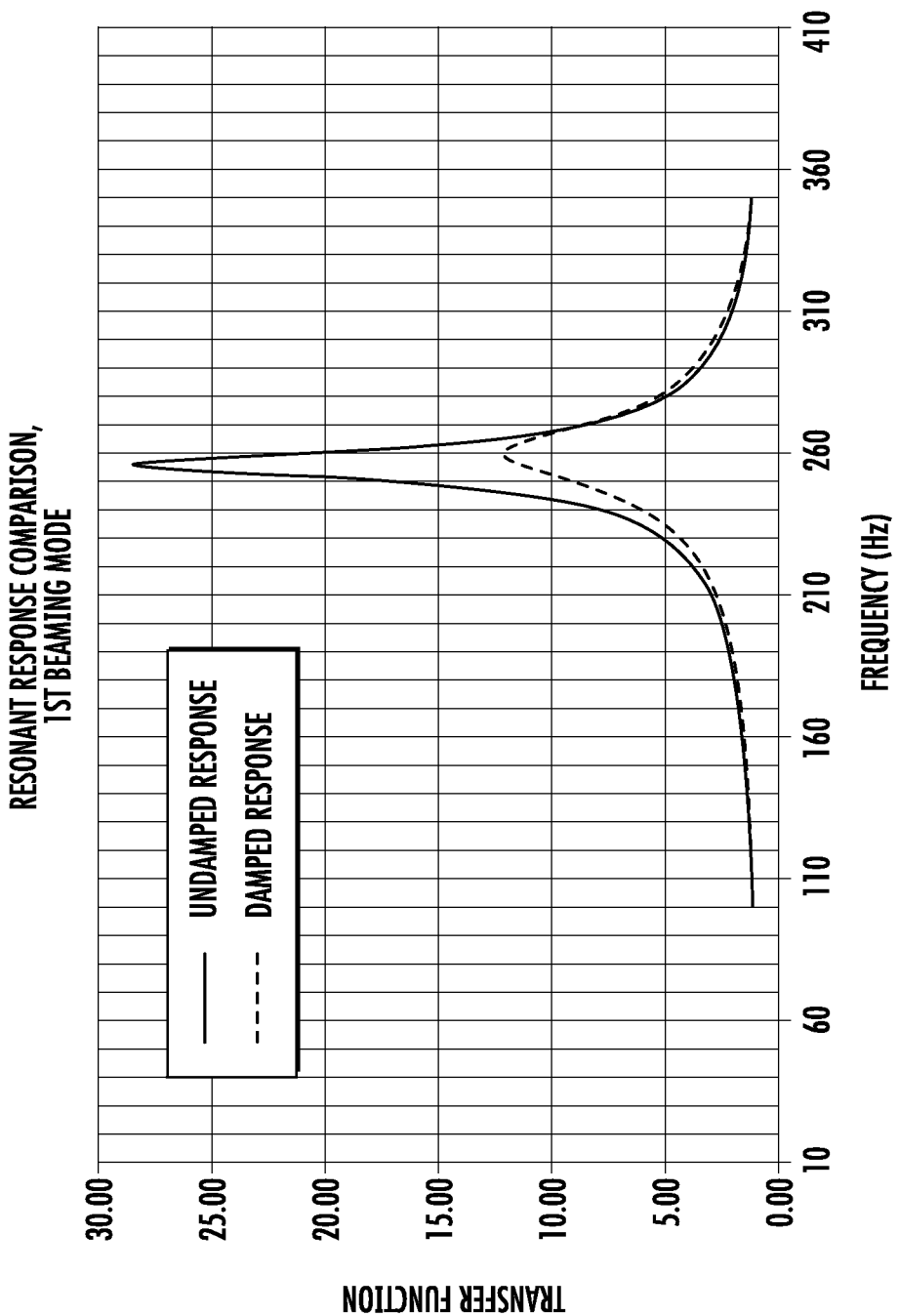
FIG. 3 is a graphical illustration comparing damped and un-damped beaming responses according to an embodiment of the presently disclosed subject matter.

FIG. 3 is an exemplary graphical illustration comparing damped and un-damped beaming responses according to an embodiment of the presently disclosed subject matter. FIG. 3 is a graphical illustration of the reduction in frequency of a beam deflection with and without damping. Damping may be provided via a damping system (e.g., 100, FIG. 1A) or a damping device (e.g., 200, FIG. 1B) disposed inside of a hollow structural component 101. Damping systems and devices stiffen the structural component 101 as well as damp vibration via damping elements without adding significant weight. In some embodiments, damping devices provided about 28% reduction in the resonant transmissibility for the first bending mode. In some aspects, the damping elements described herein are configured to reduce the amplitude of at least the first bending mode of the structural component 101.

In some embodiments, damping devices and systems herein add only a minimal amount of weight to the structural component 101. For example, damping devices and/or systems described herein may add about 14% or less to the original strut (e.g., 101) weight. In some embodiments, the thickness of many shafts, struts, or beams, which are designed according to fatigue strength through resonance, may be reduced when vibrations are effectively damped as described herein. Thus, devices, systems, and methods herein may also allow a strut having a reduced thickness and/or diameter. That is, structural components 101 herein, including the damper element, may weight less than available thicker struts that are designed for increased fatigue strength.

As FIG. 3 illustrates, a reduction in amplitude of the frequency of a first beaming mode is provided by damping systems and/or devices described herein. FIG. 3 illustrates the reduction in amplitude for a standard beam with a slenderness ratio of about 18. As FIG. 3 illustrates, damping devices and/or systems can achieve an about 60% reduction in the amplitude of resonant frequency for the first beaming mode.

Figure 4:
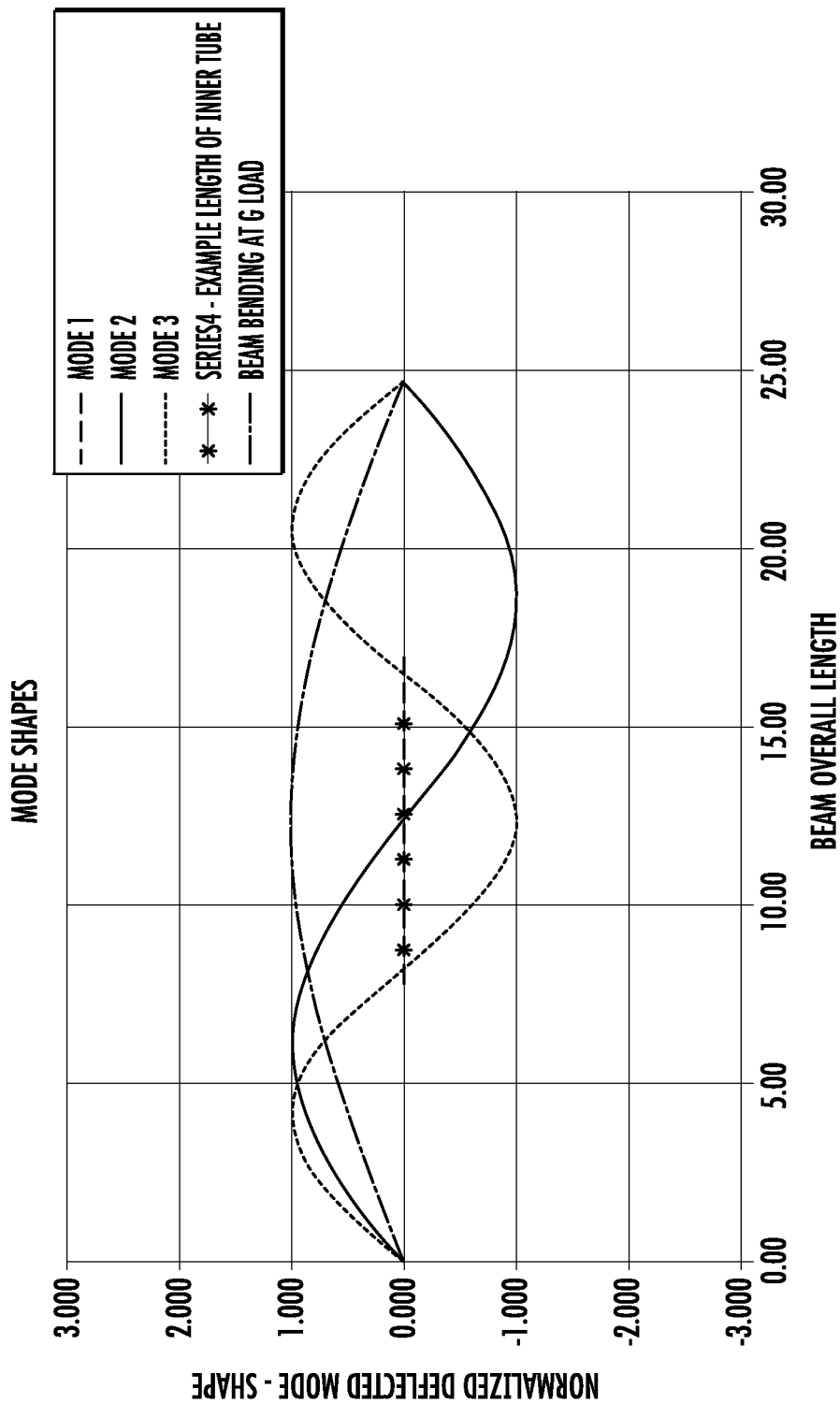
FIG. 4 is a graphical illustration of the primary beaming mode-shapes for a simply supported structural component.

FIG. 4 is a graphical illustration of the primary beaming mode-shapes for a simply supported structural component 101. FIG. 4 graphically illustrates the type of mode shapes that can be targeted for reduction via damping devices and systems described herein. In FIG. 4, the x-axis is the primary shaft overall length (e.g., the length of 101, FIG. 1A), and the y-axis is the normalized deflected mode-shape with respect to the shaft.

FIG. 4 illustrates the first three primary beaming mode-shapes for a simply supported shaft or strut. Mode 1 is the mode-shape at its first natural frequency, Mode 2 at its second natural frequency, and Mode 3 at its third natural frequency. Series 4 represents an exemplary length of an internal damping element (e.g., tube member 202). Thus, a small and lightweight internal damping element can minimize the amplitude of the first three bending modes, in addition to torsional modes by at least about 20% to about 60% or more as noted above. It will be appreciated that FIGS. 3 and 4 are exemplary, and for illustrative purposes only.

Other embodiments of the current subject matter will be apparent to those skilled in the art from a consideration of this specification or practice of the subject matter disclosed herein. Thus, the foregoing specification is considered merely exemplary of the current subject matter with the true scope thereof being defined by the following claims.

What is claimed is:
1. A damping device comprising:
a tube member configured for disposing inside of a hollow structural component having a component body, the tube member having a first end, a second end, a first end fitting at the first end, and an outer diameter that is smaller than an inner diameter of the component body;
a first damping element positioned axially beyond the first end of the tube member and having an inner diameter that is smaller than the outer diameter of the tube member;
a first adapter that is threadably engaged within the first end fitting of the tube element, such that the first adapter extends axially away from the first end of the tube member, wherein the outer diameter of the first adapter is smaller than an inner diameter of the tube member, the inner diameter of the first damping element is a same as or bigger than an outer diameter of the first adapter, and the first damping element is positioned around the first adapter, such that the first damping element is attached to the tube member at the first end of the tube member via the first adapter; and
a second damping element;
wherein the first damping element and the second damping element are configured to flex against the structural component to dissipate energy from the structural component and to reduce bending of the structural component due to modal characteristics induced by vibration of the structural component; and
wherein the damping device is configured to physically contact the structural component at a first location via the first damping element, at a third location via the second damping element, and at a second location, which is between the first and third locations.

2. The device of claim 1, wherein the second location is in a location proximate a center of a longitudinal axis of the structural component.

3. The device of claim 1, wherein the tube member is configured to have a length that is between about 10% and about 80% of a length of the structural component.

4. The device of claim 1, wherein at least one of the first and second damping elements comprises silicone.

5. The device of claim 1, wherein at least one of the first and second damping elements comprises a spring element configured to clamp a friction element to an insert element to generate a frictional force to damp vibration.

6. The device of claim 1, wherein at least one of the first and second damping elements comprise a metallic mesh.

7. The device of claim 1, wherein the first damping element and the second damping element are configured to flex against an inner wall of the structural component.

8. The device of claim 1, wherein the tube member is configured for attachment to the structural component via a retention ring, a clamp, an adhesive, a brazed connection, or a welded connection.

9. A damping system comprising:
a hollow structural component comprising a component body and at least one inner wall with an inner diameter; and
a damping device, which is disposed within the structural component and comprises:
a tube member that is concentrically disposed within the structural component and has a first end, a second end, a first end fitting at the first end, and an outer diameter that is smaller than an inner diameter of the component body;
a first damping element positioned axially beyond the first end of the tube member and having an inner diameter that is smaller than the outer diameter of the tube member;
a first adapter that is threadably engaged within the first end fitting of the tube element, such that the first adapter extends axially away from the first end of the tube member, wherein the outer diameter of the first adapter is smaller than an inner diameter of the tube member, the inner diameter of the first damping element is a same as or bigger than an outer diameter of the first adapter, and the first damping element is positioned around the first adapter, such that the first damping element is attached to the tube member at the first end of the tube member via the first adapter; and
a second damping element;
wherein the first and second damping elements are configured flex against the structural component to dissipate energy from the structural component and to reduce bending of the structural component due to modal characteristics induced by vibration of the structural component; and
wherein the damping device physically contacts the inner wall of the structural component at a first location via the first damping element, at a third location via the second damping element, and at a second location, which is between the first and third locations..

10. The system of claim 9, wherein the second location is in a location proximate a center of a longitudinal axis of the structural component.

11. The system of claim 9, wherein the first and second ends are opposing ends of the tube member.

12. The system of claim 9, wherein the tube member comprises a length that is between about 10% and about 80% of a length of the structural component.

13. The system of claim 9, wherein at least one of the first and second damping elements comprises silicone.

14. The system of claim 9, wherein at least one of the first and second damping elements comprises a spring element configured to clamp a friction element to an insert element for generating a frictional force to damp vibration.

15. The system of claim 9, wherein at least one of the first and second damping elements comprises a metallic mesh.

16. The system of claim 9, wherein at least one of the first and second damping elements is configured to reduce a resonant amplitude of at least a first bending mode of the structural component.

17. A method of vibration damping, the method comprising:
providing a hollow structural component comprising a component body;
disposing a damping device within the structural component, the damping device comprising:
a tube member having a first end, a second end, a first end fitting at the first end, and an outer diameter that is smaller than an inner diameter of the component body;
a first damping element positioned axially beyond the first end of the tube member and having an inner diameter that is smaller than the outer diameter of the tube member;
a first adapter that is threadably engaged within the first end fitting of the tube element, such that the first adapter extends axially away from the first end of the tube member, wherein the outer diameter of the first adapter is smaller than an inner diameter of the tube member, the inner diameter of the first damping element is a same as or bigger than an outer diameter of the first adapter, and the first damping element is positioned around the first adapter, such that the first damping element is attached to the tube member at the first end of the tube member via the first adapter; and
a second damping element attached to the second end of the tube member;
positioning the tube member inside of the structural component so that the damping device physically contacts the structural component at a first location via the first damping element, at a third location via the second damping element, and at a second location, which is between the first and third locations; and
flexing the first and second damping elements against the structural component for dissipating energy from the structural component and for reducing bending of the structural component due to modal characteristics induced by vibration of the structural component.

18. The method of claim 17, wherein the second location is in a location that is proximate a center of a longitudinal axis of the structural component.

19. The device of claim 1, wherein the structural component is elongated, having a length that is greater than a diameter of the structural component, and wherein the tube member is elongated, having a length that is greater than a diameter of the tube member.

20. The system of claim 9, wherein the structural component is elongated, having a length that is greater than a diameter of the structural component, and wherein the tube member is elongated, having a length that is greater than a diameter of the tube member.

\* \* \* \* \*